United States Patent
Hughes et al.

(10) Patent No.: US 11,501,361 B2
(45) Date of Patent: Nov. 15, 2022

(54) SYSTEMS AND METHODS FOR GENERATING A USER INTERFACE INCLUDING ITEM SELECTION INTERFACE ELEMENTS ARRANGED BASED ON RELEVANCE DATA AND CONFIGURED FOR EXECUTING TRANSITION ROUTINES BASED ON RECEIPT OF AN EXPIRATION SIGNAL

(71) Applicant: Groupon, Inc., Chicago, IL (US)

(72) Inventors: Justin Michael Hughes, Chicago, IL (US); Jeffrey A. Holden, Chicago, IL (US); Jeffrey M. Ayars, Geneva, IL (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 17/301,085

(22) Filed: Mar. 24, 2021

(65) Prior Publication Data

US 2021/0233155 A1   Jul. 29, 2021

Related U.S. Application Data

(63) Continuation of application No. 16/121,751, filed on Sep. 5, 2018, now Pat. No. 10,997,646, which is a continuation of application No. 14/495,747, filed on Sep. 24, 2014, now Pat. No. 10,102,562.

(60) Provisional application No. 61/883,525, filed on Sep. 27, 2013.

(51) Int. Cl.
*G06Q 30/00*    (2012.01)
*G06Q 30/06*    (2012.01)
*G06Q 30/02*    (2012.01)

(52) U.S. Cl.
CPC ..... *G06Q 30/0635* (2013.01); *G06Q 30/0235* (2013.01); *G06Q 30/0264* (2013.01)

(58) Field of Classification Search
CPC .......... G06Q 30/0635; G06Q 30/0235; G06Q 30/0264
See application file for complete search history.

(56) References Cited

U.S. PATENT DOCUMENTS

| | | |
|---|---|---|
| 5,960,411 A | 9/1999 | Hartman et al. |
| 6,266,649 B1 | 7/2001 | Linden et al. |
| 6,587,835 B1 | 7/2003 | Treyz et al. |
| 7,107,227 B1 | 9/2006 | Bezos et al. |

(Continued)

OTHER PUBLICATIONS

Bustos, Linda, Cross-Selling Tips for Online Retailers, dated Jan. 2, 2008, downloaded from https://www.elasticpath.com/blog/cross-selling-tips-ecommerce on May 20, 2021 (Year: 2008).

(Continued)

*Primary Examiner* — Alvin L Brown
(74) *Attorney, Agent, or Firm* — Alston & Bird LLP

(57) ABSTRACT

Systems, apparatus, methods, and non-transitory media for providing user interfaces are discussed herein. Some examples may include an apparatus configured to determine one or more additional items based on relevance data related to a primary purchase item that is associated with a user profile, generate a user interface, determine at least one selected item from the one or more additional items, receive an expiration signal indicating expiration of an automatic completion time period, and execute an automatic purchase completion transition routine associated with the at least one selected item in response to receiving the expiration signal.

20 Claims, 11 Drawing Sheets

(56) References Cited

U.S. PATENT DOCUMENTS

| | | |
|---|---|---|
| 9,215,269 B2 | 12/2015 | Freeman et al. |
| 2006/0173830 A1 | 8/2006 | Smyth et al. |
| 2010/0017022 A1 | 1/2010 | Walker et al. |
| 2011/0178897 A1 | 7/2011 | Balasubramanian et al. |
| 2011/0246293 A1 | 10/2011 | Hayward et al. |
| 2012/0253927 A1 | 10/2012 | Qin et al. |
| 2013/0317921 A1 | 11/2013 | Havas |
| 2014/0074605 A1 | 3/2014 | Sanchez |
| 2014/0324215 A1 | 10/2014 | Leblang |

OTHER PUBLICATIONS

Google Search Results for Search History Recommend Additional Items To Purchase, downloaded from https://www.google.com/search?q=search+history+recommend+additional+items+to+purchase&source=Int&tbs=cdr%3A1%2Ccd min%3A%2Ccd max% 3A9-27-2013&tbm=#spf=1567774053794 on Sep. 6, 2019, limited to <Sep. 6, 2013. (Year: 2019).

JSTOR preview of Inman, Jeffery and McAlister, Leigh, Do Coupon Expiration Dates Affect Consumer Behavior?, Journal of Marketing Research, vol. 31, No. 3, Aug. 1994, accessed Nov. 16, 2018 at https://www.jstor.org/stable/3152229?seq=1# page_scan_tab_contents (Year: 1994).

Inman et al., *Do Coupon Expiration Dates Affect Consumer Behavior?*, JSTOR, Journal of Marketing Research, vol. 31 No. 3, Aug. 1994, accessed Nov. 16, 2018 at https://www.jstor.org/stable/3152229?seq=1#page_scan_tab_contents (Year: 1994).

Bustos, Linda, "*How Long Should You Persist a Shopping Cart?*", Sep. 8, 2010, www.getelastic.com, pp. 1-5.

1-Click, from Wikipedia, downloaded Apr. 18, 2015 from http://en.wikipedia.org/wiki/1-click.

Google Search Results for SearchHistoryRecommendAdditionalItemsTo Purchase, downloaded from https://www.google.com/search?q=search+history+recommend+additional+items+to+purchase&source=Int&tbs=cdr%3A1%2Ccd_min%3A2Ccd_max%3A9-27-2013&tbm=#spf=1567774053749 on Sep. 6, 2019, limited to <Sep. 6, 2013. (Year: 2019).

Google Search Results for SearchQueryRelevanceMetric, downloaded from https://www.google.com/search?q=search+query+relevance+metric&source=Int&tbs=cdr%3A1%2Ccd_min%3A%2Ccd_max%3A9-27-2013&tbm=#spf=1567781255106 on Sep. 6, 2019, limited to before Sep. 6, 2013. (Year: 2019).

Jacobs, Deborah L., *Six Things You Might Not Know About Daily Deals*, Forbes, downloaded from https://www.forbes.com/sites/deborahljacobs/2012/12/05/six-things-you-might-not know (Nov. 16, 2018).

Gaudet, Charles, American Express, Tips for Upselling: A Lesson from McDonald's, dated Jan. 26, 2012, downloaded Nov. 20, 2021 from https://www.americanexpress.com/en-us/business/trends-and-insights/articles/tips-for-upselling-a-lesson-from-mcdonalds/ (Year: 2012).

Miley, Michelle, What is Up-Selling & Cross Selling?, downloaded from https://web.archive.org/web/20111023193912/https://smallbusiness.chron.com/upselling-cross-selling-23812.html via the Archive.org Wayback Machine, dated Oct. 23, 2011, and downloaded Nov. 20, 2021, (Year: 2011).

U.S. Appl. No. 16/121,751, filed Sep. 5, 2018, 2019/0180347, Allowed.

U.S. Appl. No. 14/495,747, filed Sep. 24, 2014, U.S. Pat. No. 10,102,562, Issued.

FIG. 7

SYSTEMS AND METHODS FOR GENERATING A USER INTERFACE INCLUDING ITEM SELECTION INTERFACE ELEMENTS ARRANGED BASED ON RELEVANCE DATA AND CONFIGURED FOR EXECUTING TRANSITION ROUTINES BASED ON RECEIPT OF AN EXPIRATION SIGNAL

CROSS REFERENCE TO RELATED APPLICATIONS

This application is a continuation of U.S. patent application Ser. No. 16/121,751, title "Systems and Methods for Providing Multiple Items to Consumers" and filed Sep. 5, 2018, which is a continuation of U.S. patent application Ser. No. 14/495,747, titled "Systems and Methods for Providing Multiple Items to Consumers," filed Sep. 24, 2014, which claims the benefit of U.S. Provisional Patent Application No. 61/883,525, titled "Systems and Methods for Providing Multiple Items to Consumers," filed Sep. 27, 2013, each of which are incorporated by reference herein in their entirety.

FIELD

Embodiments of the invention relate, generally, to techniques for providing items and/or promotions to consumers.

BACKGROUND

Via electronic networks (e.g., the Internet), systems can be configured to provide promotions and/or other items (e.g., products, services, and/or experiences) associated with merchants to consumer devices. In this regard, areas for improving current systems have been identified.

BRIEF SUMMARY

Through applied effort, ingenuity, and innovation, solutions to improve such systems have been realized and are described herein. Some embodiments may provide for a system configured to provide multiple items to consumers with efficient and streamlined user interfaces for adding additional items to a completed primary purchase transaction. The system may include one or more servers including communications circuitry and processing circuitry. The communications circuitry may be configured to connect with consumer devices via a network. The processing circuitry may be configured to: provide an electronic user interface to a consumer device via the network, the electronic user interface including an impression with an indication of one or more items; receive, via the network and from the consumer device, an item selected via the electronic user interface for primary purchase; complete a primary purchase transaction for the selected item; initiate an add-to-order session timer subsequent to completing the primary purchase transaction; generate an add-to-order display of add-to-order content including additional items offered for purchase; provide, via the network, the add-to-order display to the electronic user interface; receive, via the network and from the consumer device, a selection of an additional item offered for purchase prior to expiration of the add-to-order session timer; and in response to determining that the add-to-order session timer has expired, complete a purchase transaction for the additional item.

In some embodiments, the processing circuitry may be further configured to, in response to receiving the selection of the additional item offered for purchase prior to expiration of the add-to-order session timer, provide a second additional item for purchase to the consumer by unlocking a selectable icon of the add-to-order display associated with the second additional item.

In some embodiments, the processing circuitry may be further configured to: determine purchase transaction data; complete the primary purchase transaction for the selected item based on the purchase transaction data; and in response to determining that the add-to-order session timer has expired, complete the purchase transaction for the additional item based on the purchase transaction data.

In some embodiments, the additional items offered for purchase may include promotions. In some embodiments, the add-to-order display may include a link to digital content describing the additional item. In some embodiments, the add-to-order display includes an indication of the add-to-order session timer.

In some embodiments, the add-to-order display may indicate one or more of a discount, credit, and free shipping receivable upon purchase of the additional item prior to expiration of the add-to-order session timer. The processing circuitry configured to complete the purchase transaction for the additional item may include the processing circuitry being configured to provide the one or more of the discount, credit, and free shipping to a consumer account associated with the consumer device.

In some embodiments, the processing circuitry configured to complete the primary purchase transaction for the selected item includes the circuitry being configured to: initiate a purchase confirm countdown timer; generate a purchase confirm countdown timer display indicating the purchase confirm countdown timer; provide, via the network, the purchase confirm countdown timer display to the electronic user interface; and in response to receiving a primary purchase confirmation prior to expiration of the purchase confirm countdown timer, associate the item with a consumer account as a purchased item.

In some embodiments, the processing circuitry is further configured to: determine data representing a set of items available for purchase; assign a respective relevance metric to each item of the set of items based on at least one of attributes of the item and attributes associated with a consumer account; and select the additional items offered for purchase via the add-to-order display based on the relevance metric of each item of the set of items. In some embodiments, the attributes associated with the consumer account may include previous consumer behavior of a consumer tracked by the processing circuitry based on communication with the consumer device via the network. In some embodiments, the processing circuitry may be further configured to determine the previous consumer behavior based on at least one of: consumer preference data associated with the consumer account; purchase data associated with the consumer account; profile data associated with the consumer account; and search query data associated with the consumer account.

Some embodiments may provide for a computer-implemented method. The method may include: providing, by circuitry connected with consumer devices via a network, an electronic user interface to a consumer device via the network, the electronic user interface including an impression with an indication of one or more items; receiving, by the circuitry and from the consumer device, an item selected via the electronic user interface for primary purchase; completing, by the circuitry, a primary purchase transaction for the selected item; initiating, by the circuitry, an add-to-order session timer subsequent to completing the primary purchase transaction; generating, by the circuitry, an add-to-order display of add-to-order content including additional items offered for purchase; providing, by the circuitry and via the network, the add-to-order display to the electronic user interface; receiving, by the circuitry via the network from the consumer device, a selection of an additional item offered for purchase prior to expiration of the add-to-order session timer; and in response to determining that the add-to-order session timer has expired, completing, by the circuitry, a purchase transaction for the additional item.

In some embodiments, completing the primary purchase transaction for the selected item may further include, by the processing circuitry: initiating a purchase confirm countdown timer; generate a purchase confirm countdown timer display indicating the purchase confirm countdown timer; providing, via the network, the purchase confirm countdown timer display to the electronic user interface; and in response to receiving a primary purchase confirmation prior to expiration of the purchase confirm countdown timer, associating the item with a consumer account as a purchased item In some embodiments, the method may further include: determining purchase transaction data; completing the primary purchase transaction for the selected item based on the purchase transaction data; and in response to determining that the add-to-order session timer has expired, completing the purchase transaction for the additional item based on the purchase transaction data.

In some embodiments, the method may further include, in response to receiving the selection of the additional item offered for purchase prior to expiration of the add-to-order session timer, providing a second additional item for purchase to the consumer by unlocking a selectable icon of the add-to-order display associated with the second additional item.

In some embodiments, the additional items offered for purchase may be promotions. In some embodiments, the add-to-order display may include at least one of digital content describing the additional item and a link to the digital content. In some embodiments, the add-to-order display may include an indication of the add-to-order session timer.

In some embodiments, the add-to-order display may indicate one or more of a discount, credit, and free shipping receivable upon purchase of the additional item prior to expiration of the add-to-order session timer; and completing the purchase transaction for the additional item may include providing the one or more of the discount, credit, and free shipping to a consumer account associated with the consumer device.

In some embodiments, the method may further include, by the processing circuitry: determining data representing a set of items available for purchase; assigning a respective relevance metric to each item of the set of items based on at least one of attributes of the item and attributes associated with a consumer account; and selecting the additional items offered for purchase based on the relevance metric of each of the items of the set of items.

In some embodiments, the attributes associated with the consumer account may include previous consumer behavior of a consumer tracked by the processing circuitry based on communication with the consumer device via the network.

Some embodiments may provide for an apparatus including networked circuitry connected with consumer devices via the Internet, the networked circuitry configured to: provide an electronic user interface to a consumer device via the network, the electronic user interface including an impression with an indication of one or more items; receive, via the network and from the consumer device, an item selected via the electronic user interface for primary purchase; complete a primary purchase transaction for the selected item, wherein the processing circuitry configured to complete the primary purchase transaction includes the processing circuitry being configured to: initiate a purchase confirm countdown timer; generate a purchase confirm countdown timer display indicating the purchase confirm countdown timer; provide, via the network, the purchase confirm countdown timer display to the electronic user interface; and in response to receiving a primary purchase confirmation prior to expiration of the purchase confirm countdown timer, associate the item with a consumer account as a purchased item. The networked circuitry may be further configured to: initiate an add-to-order session timer subsequent to completing the primary purchase transaction; generate an add-to-order display of add-to-order content including additional items offered for purchase; provide, via the network, the add-to-order display to the electronic user interface; receive, via the network and from the consumer device, a selection of an additional item offered for purchase prior to expiration of the add-to-order session timer; and in response to determining that the add-to-order session timer has expired, complete a purchase transaction for the additional item.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
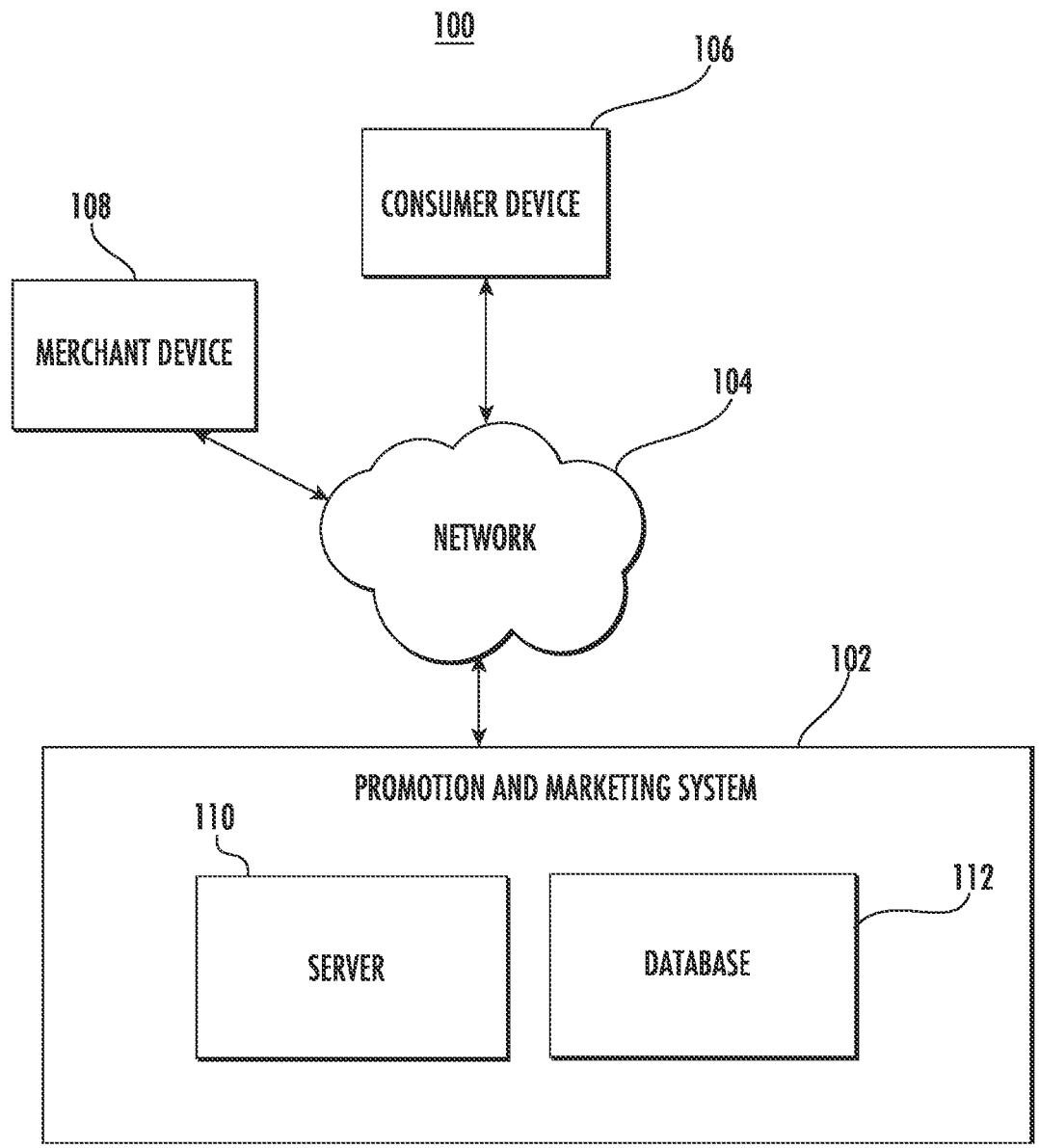
Figure 2:
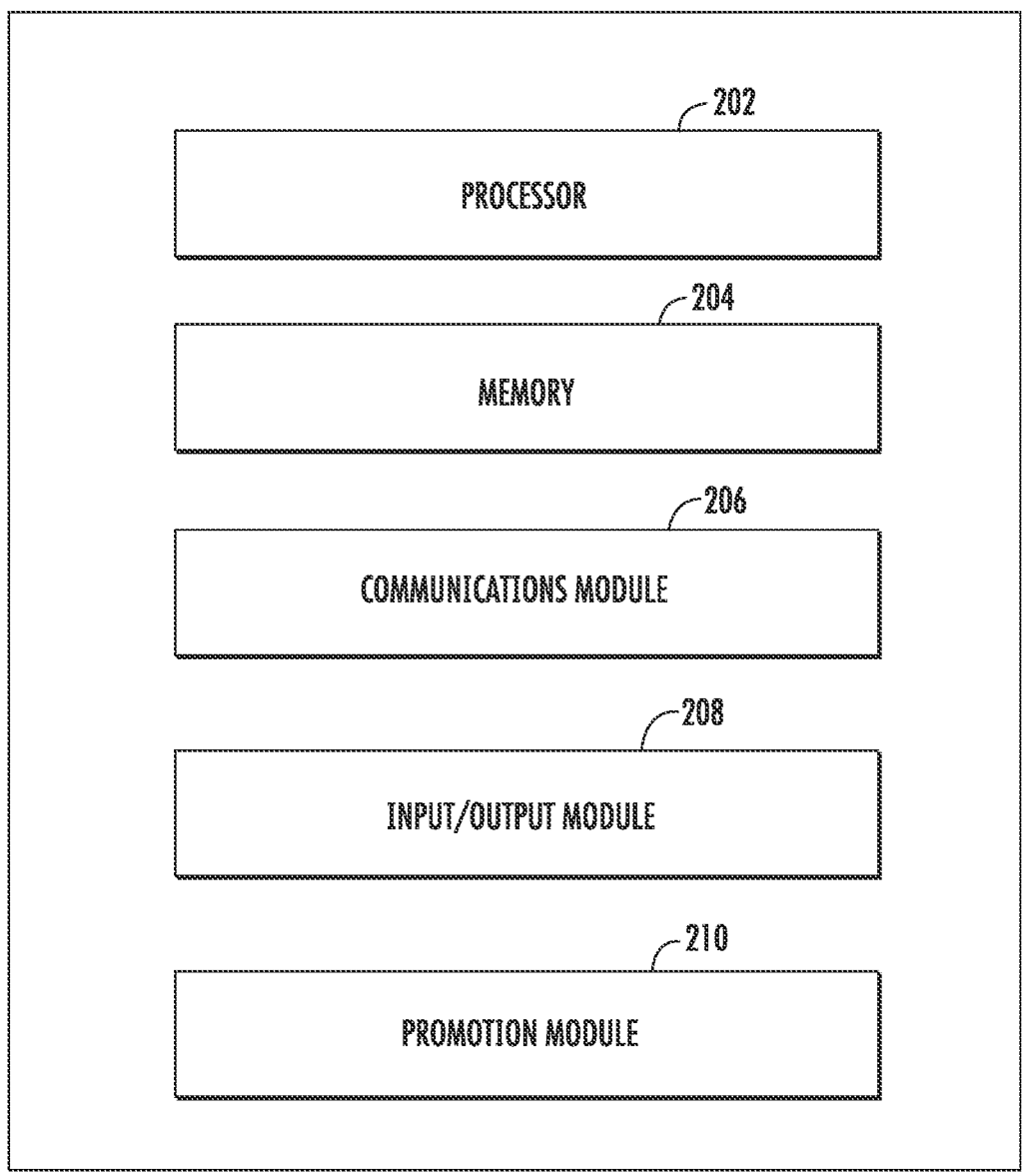
Figure 3:
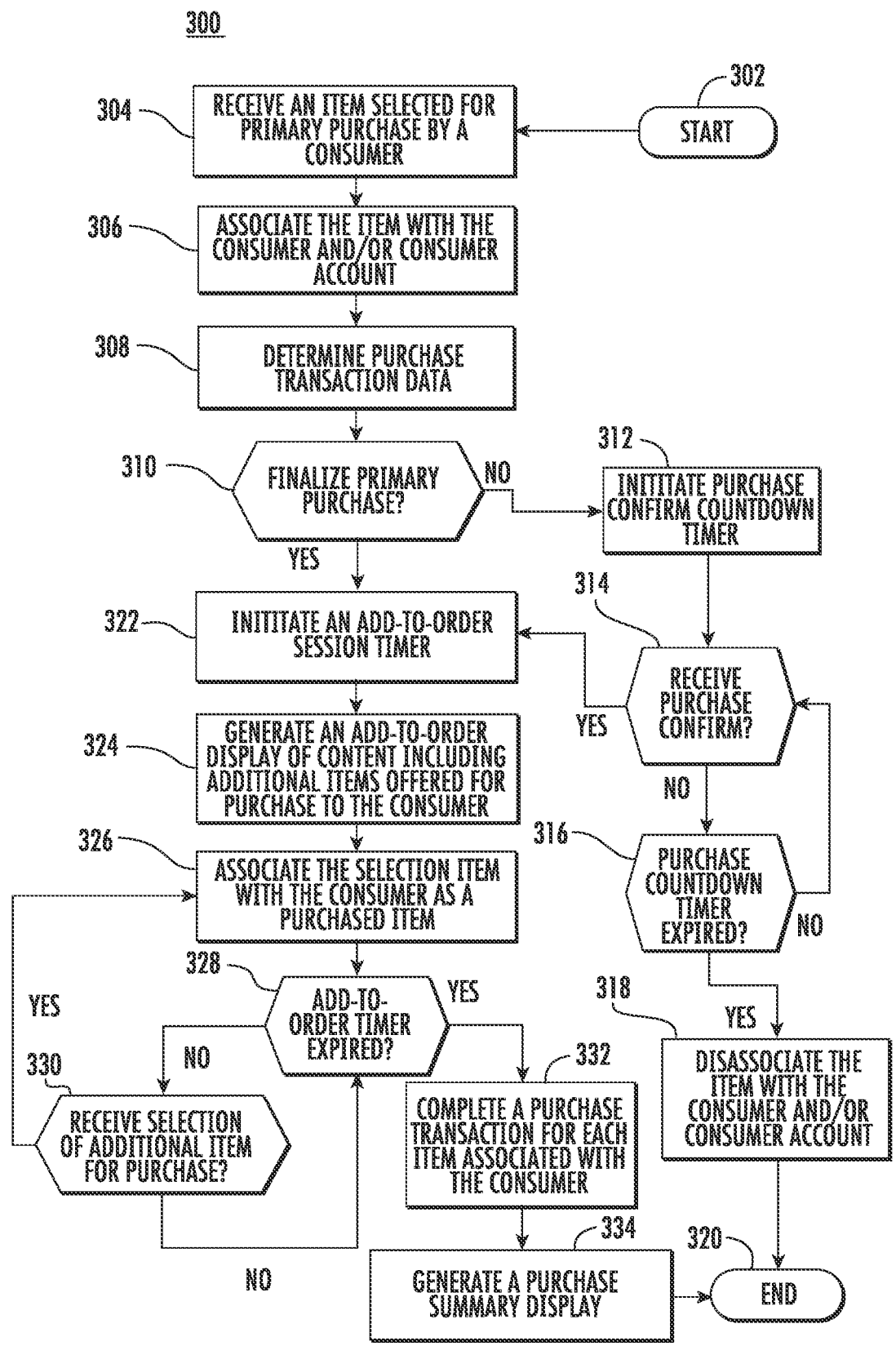
Figure 4:
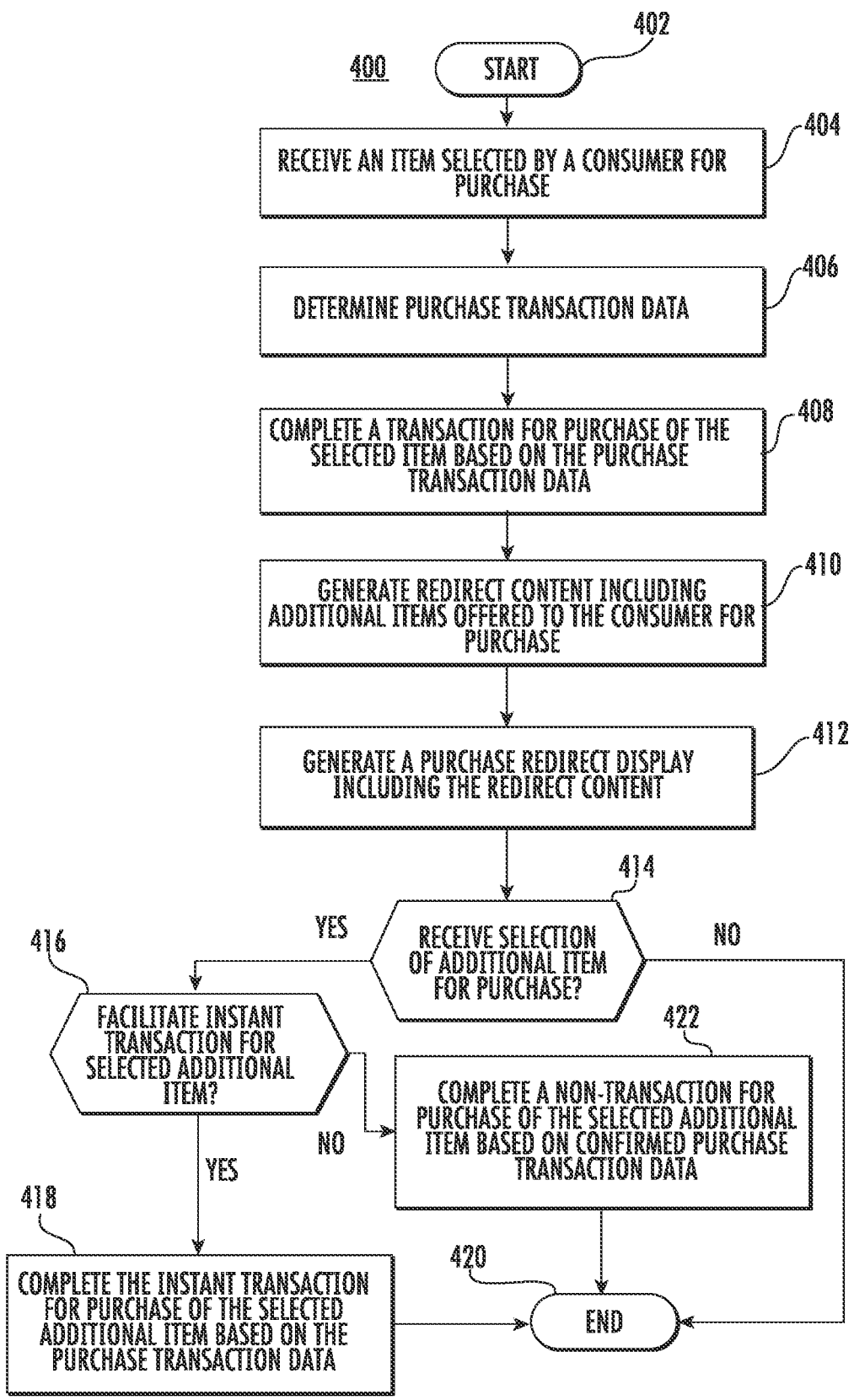
Figure 5:
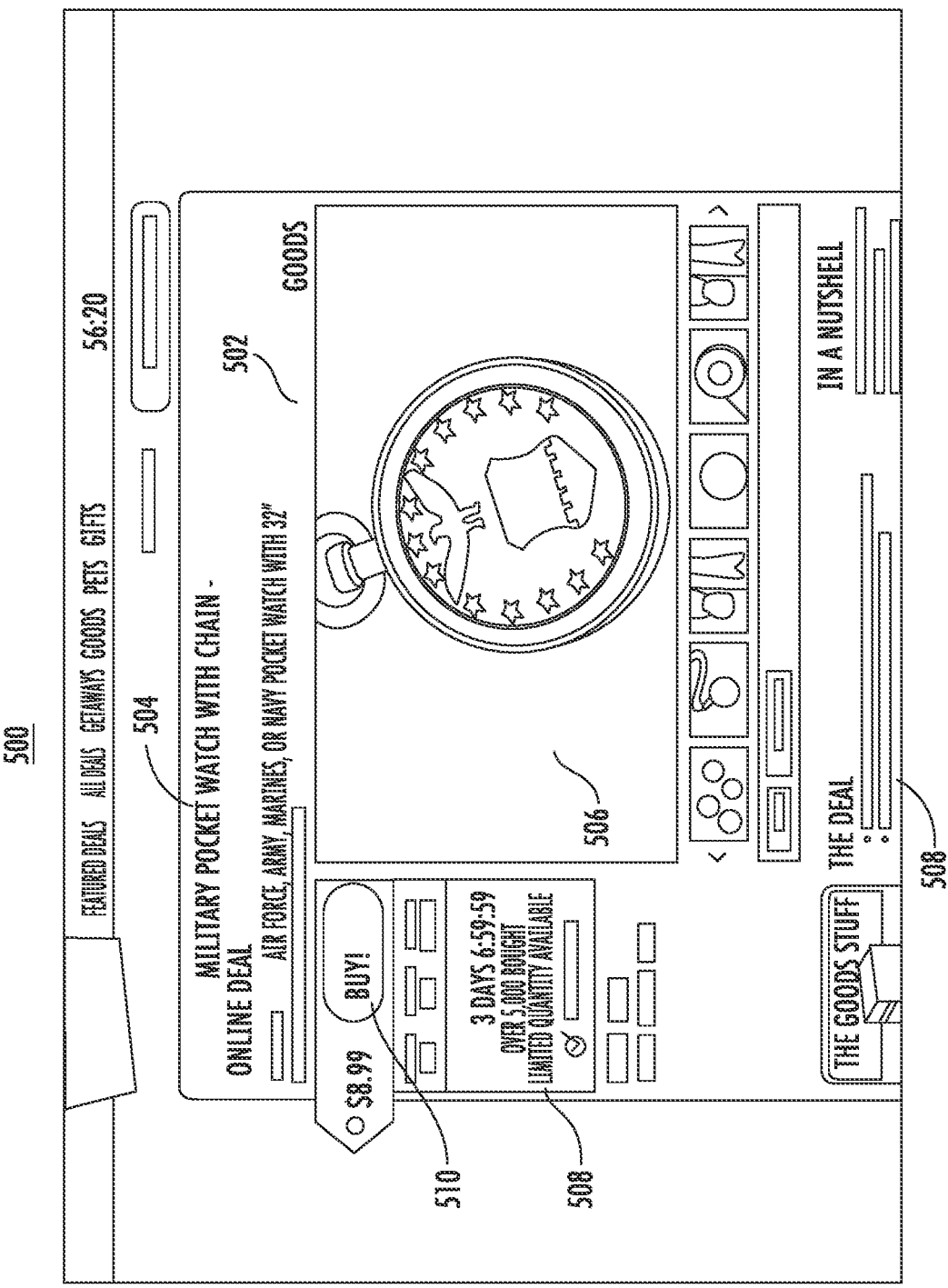
Figure 6:
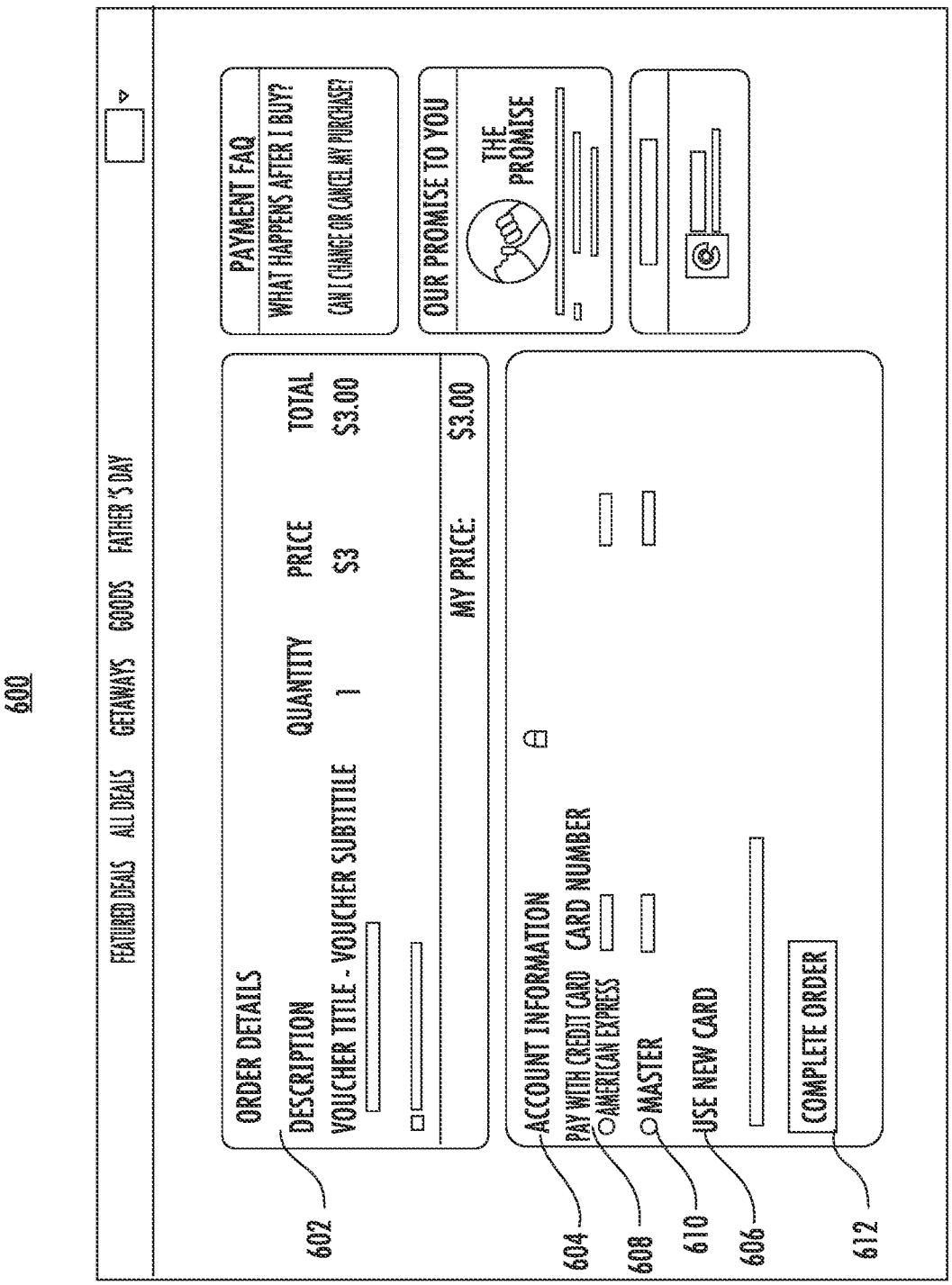
Figure 8:
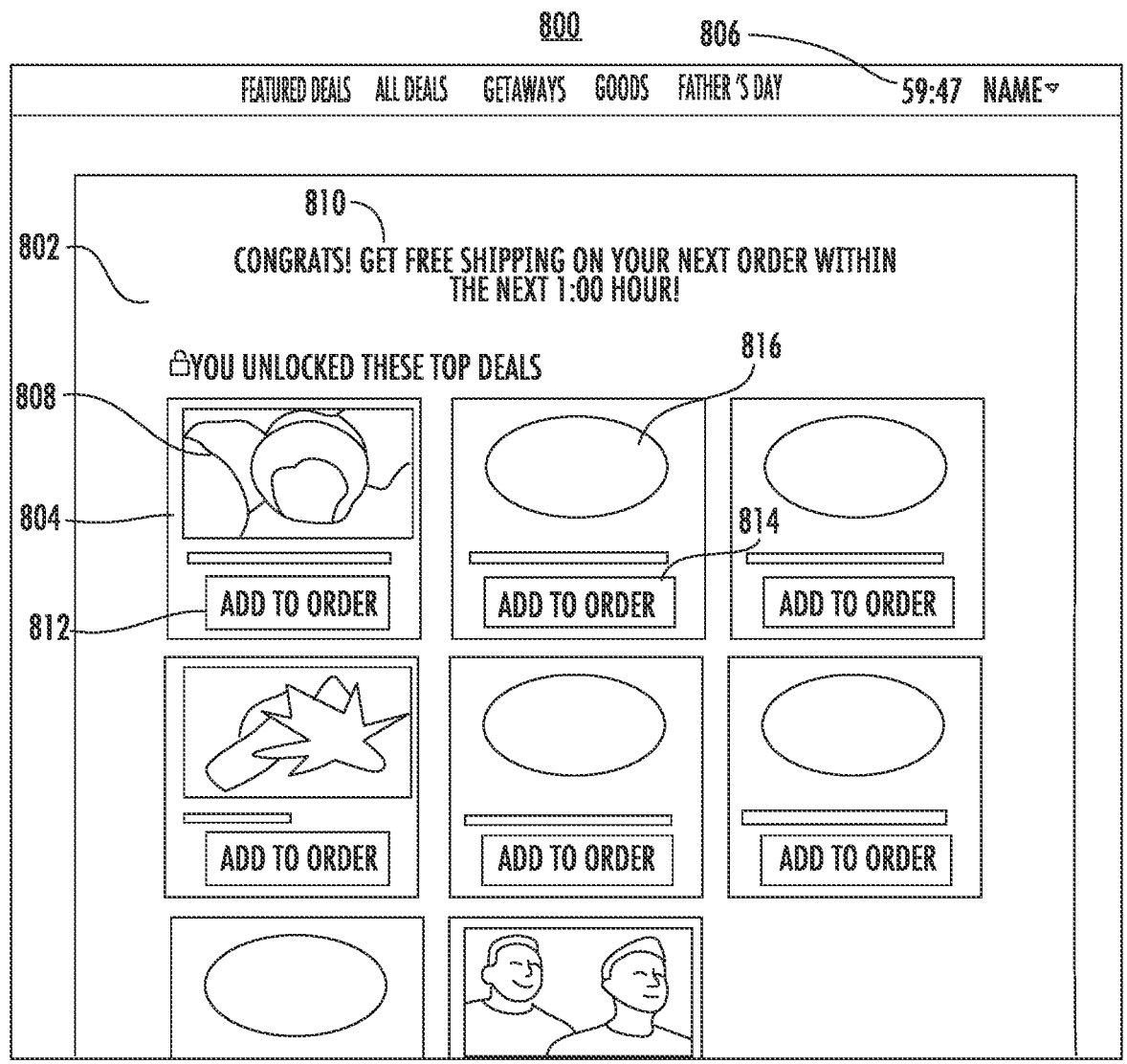
Figure 9:
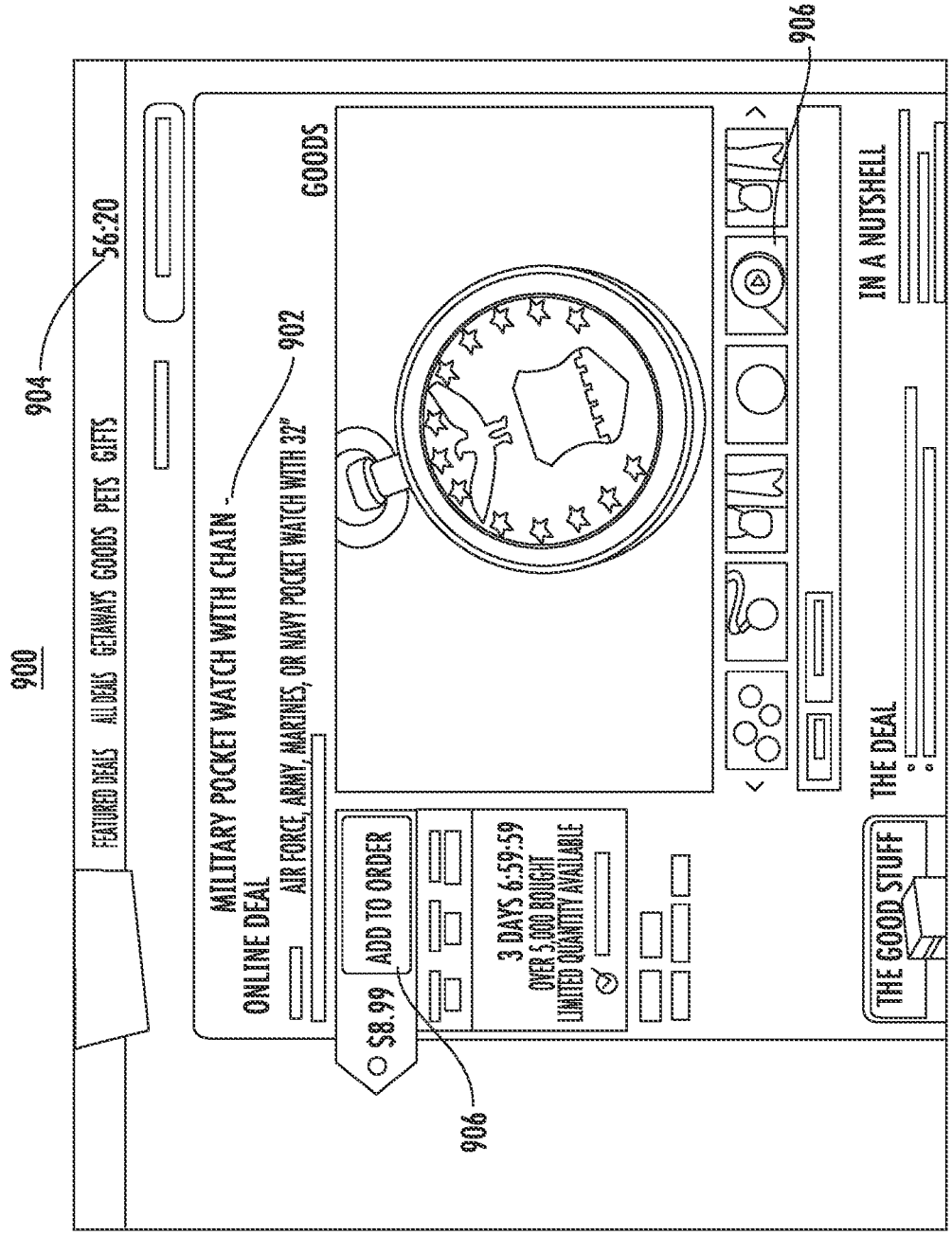
Figure 10:
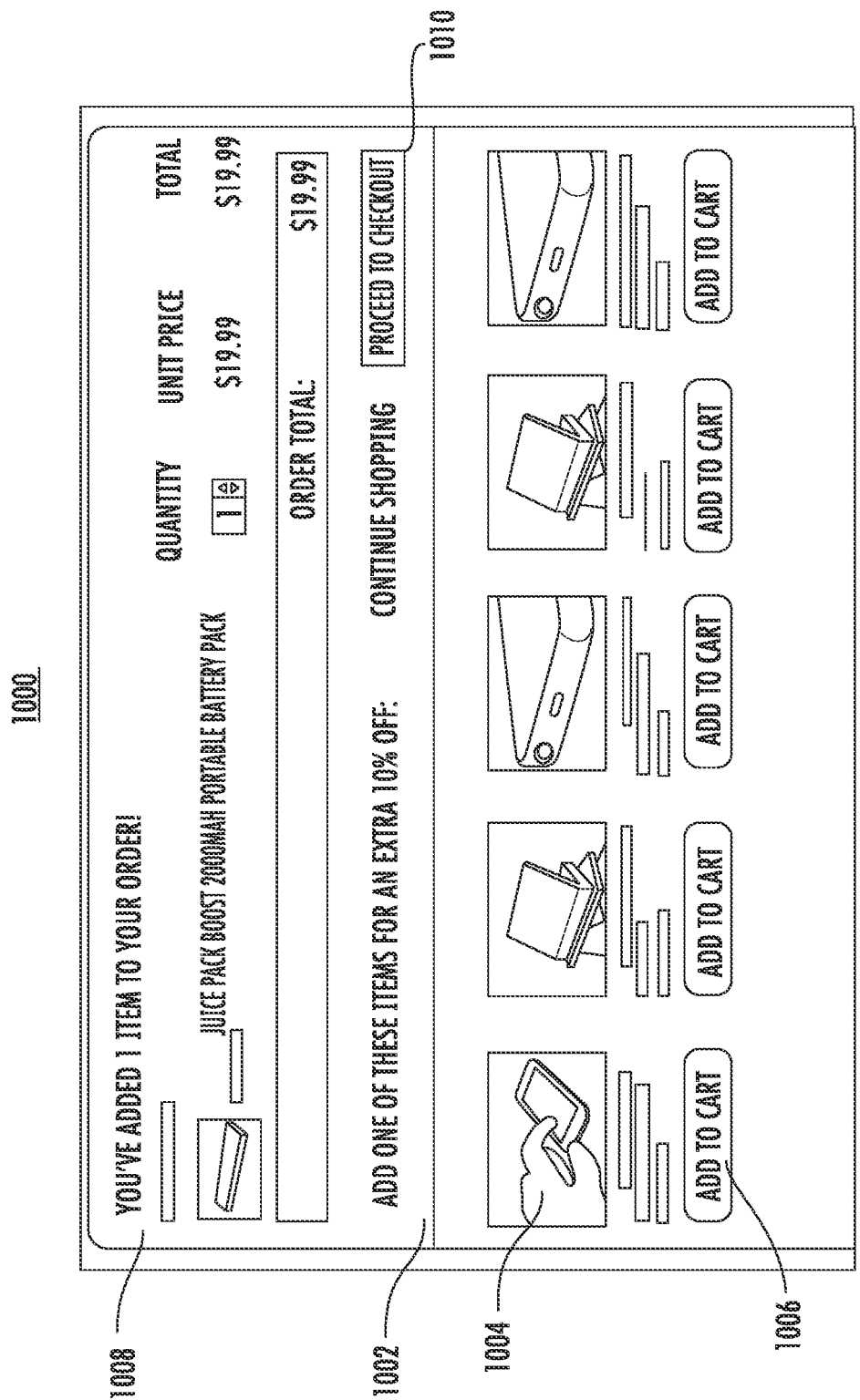
Figure 11:
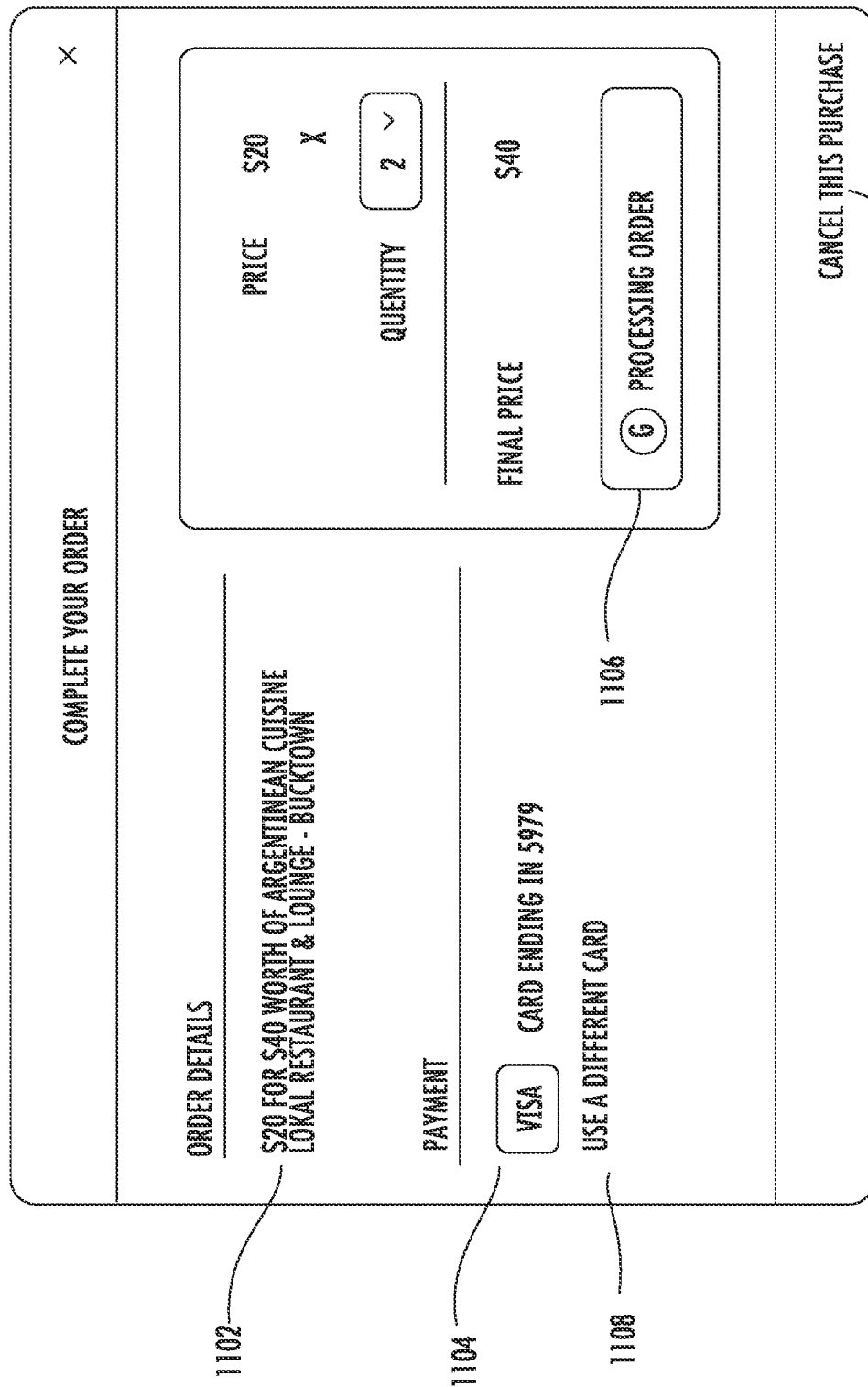

Having thus described some embodiments in general terms, reference will now be made to the accompanying drawings, which are not necessarily drawn to scale, and wherein:

FIG. 1 shows an example system in accordance with some embodiments;

FIG. 2 shows example circuitry in accordance with some embodiments;

FIG. 3 shows an example of a method for providing multiple promotions in accordance with some embodiments;

FIG. 4 shows another example of a method for providing multiple promotions in accordance with some embodiments;

FIG. 5 shows an example of an impression in accordance with some embodiments;

FIG. 6 shows an example purchase confirmation display in accordance with some embodiments;

FIG. 7 shows an another example purchase confirmation display in accordance with some embodiments;

FIG. 8 shows an example add-to-order display in accordance with some embodiments;

FIG. 9 shows an example impression in accordance with some embodiments;

FIG. 10 shows an example checkout plus display in accordance with some embodiments; and FIG. 11 shows an example additional item purchase summary display in accordance with some embodiments.

DETAILED DESCRIPTION

Glossary

As used herein, an "item" refers to a product, service, and/or experience. An item may be included as a component of a promotion, or may be separate from a promotion.

As used herein, a "promotion" refers to any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences (i.e., "items") defined by the promotion. In that sense, some or all of the discussion herein regarding "items" may also be applicable to "promotions," and/or vice versa.

As used herein, an "impression" refers to a communication, a display, or other perceived indication, such as e-mail, text message, application alert, mobile applications, other type of electronic user interface or distribution channel and/or the like, of one or more promotions and/or items.

As used herein, a "primary purchase" or "primary purchase transaction" refers to an initial purchase (and/or acceptance) of an item in an order and/or transaction that may be followed by one or more additional items being added to the same order and/or transaction at a subsequent time.

As used herein, an "add-to-order session timer" refers to a clock that defines a period of time starting subsequent to the primary purchase transaction within which an additional item or promotion can be purchased with the purchase transaction data used to complete the primary transaction, such as stored purchase transaction data that can be used without requiring consumer reentry.

As used herein, "purchase transaction data" refers to data used to complete a purchase of an item or promotion, such as credit card information, payment information, billing address, payment account information, among other things.

Brief Overview

Methods, systems, apparatus and computer program products described herein are operable for providing multiple items to consumers. Some embodiments may be configured to provide user interfaces that incentivize consumers to purchase additional items subsequent to purchasing a first item. In various examples, consumers may be persuaded to purchase additional items based on providing additional items matched by relevance to the consumer, providing incentives (e.g., a discount, credit, and/or free shipping) for the purchase of an additional item, and/or by providing streamlined interfaces that allow consumers to purchase additional items via a minimal number of consumer inputs (e.g., two-click and/or one-click transactions). Using one or more of the techniques discussed herein, for example, a system may be configured to sell more items and/or promotions to consumers than would be otherwise possible using conventional commercial systems. In some embodiments, the system may be configured to provide an impression including one or more additional items to consumer devices and streamlined user interfaces for adding the one or more additional items to a purchase of the first item.

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a device is described herein to receive data from another device, it will be appreciated that the data may be received directly from the another device or may be received indirectly via one or more intermediary devices, such as, for example, one or more servers, relays, routers, network access points, base stations, and/or the like, sometimes referred to herein as a "network." Similarly, where a device is described herein to send data to another device, it will be appreciated that the data may be sent directly to the another device or may be sent indirectly via one or more intermediary devices, such as, for example, one or more servers, relays, routers, network access points, base stations, and/or the like.

As used herein, the term "method" refers to one or more steps that may be performed by a device, apparatus, system, circuitry, one or more processors, or the like. Where an example method is shown as including more than one step, it will be appreciated that the steps may be performed in different orders than as shown in the example and that not all steps are necessarily required. Furthermore, the methods are described herein as being performed by example structures for clarity and are not limited to those structures (e.g., a particular server, device, apparatus, etc.) in some embodiments.

Exemplary System Architecture

FIG. 1 shows an example system 100 in accordance with some embodiments. System 100 may include promotion and marketing system 102 (or "system 102"), network 104, consumer device 106, and merchant device 108. System 102 may be communicably connected with consumer device 106 and merchant device 108 via network 104. System 102 may include server 110 and database 112.

Server 110 may include circuitry, networked processors, or the like configured to perform some or all of the server-based processes described herein and may be any suitable network server and/or other type of processing device. In some embodiments, system 102 may function as a "cloud" with respect to the consumer device 106 and/or merchant device 108. In that sense, server 110 may include several servers performing interconnected and/or distributed functions. To avoid unnecessarily overcomplicating the disclosure, server 110 is shown and described herein as a single server.

Database 112 may be any suitable network storage device configured to store some or all of the information described herein. For example, database 112 may be configured to store item data and/or promotion data (e.g., attributes of an item and/or promotion), consumer data (e.g., attributes of the consumer such as profile information, preferences, purchase history, consumer behavior, among other things), and/or purchase transaction data (e.g., credit card information, payment information, billing address, payment account information, among other things). As such, database 112 may include, for example, one or more database systems, backend data servers, network databases, cloud storage devices, etc. To avoid unnecessarily overcomplicating the disclosure, database 112 is shown and described herein as a single database.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer, such as a consumer with a consumer account provided by system 102. Although a single consumer device 106 is shown, system 100 may include any number of consumer devices that may be associated with various other consumers. Consumer device 106 may be a mobile device and/or a stationary device. For example, consumer device 106 may be a mobile device such as a cellular telephone (including smartphones and/or other types of mobile telephones), laptop, tablet, electronic reader, e-book device, media device, and/or the like. Additionally and/or alternatively, consumer device 106 may be a stationary device such as a desktop computer, work station, point-of-sale device, or the like.

Merchant device 108 may be associated with a merchant or "provider," as used herein. Although a single merchant device 108 is shown, system 100 may include any number of merchant devices that may be associated with various other merchants. In some embodiments, merchant device 108 may be configured to provide point-of-sale (POS) functionality for the merchant, such as at the merchant's shop. Furthermore, merchant device 108 may be a stationary and/or mobile device. In some embodiments, system 102 may be configured to receive promotion data indicating a promotion for goods and/or services and/or one or more parameters of the promotion (e.g., target audience, timing, purchase value, promotional value, residual value, etc.). System 102 may then generate and/or provide one or more impressions for the promotion to consumer device 102.

FIG. 2 shows a schematic block diagram of example circuitry 200, some or all of which may be included in system 102, server 110, database 112, user device 106, and merchant device 108. In accordance with some example embodiments, circuitry 200 may include various means, such as one or more processors 202, memories 204, communications modules 206, and/or input/output modules 208.

In some embodiments, such as when circuitry 200 is included in system 102, promotion module 210 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 may comprise a plurality of processing means. The plurality of processing means may be embodied on a single computing device or may be distributed across a plurality of computing devices collectively configured to function as circuitry 200. The plurality of processing means may be in operative communication with each other and may be collectively configured to perform one or more functionalities of circuitry 200 as described herein. In an example embodiment, processor 202 may be configured to execute instructions stored in memory 204 or otherwise accessible to processor 202. These instructions, when executed by processor 202, may cause circuitry 200 to perform one or more of the functionalities described herein.

Whether configured by hardware, firmware/software methods, or by a combination thereof, processor 202 may comprise an entity capable of performing operations according to embodiments of the present invention while configured accordingly. Thus, for example, when processor 202 is embodied as an ASIC, FPGA or the like, processor 202 may comprise specifically configured hardware for conducting one or more operations described herein. As another example, when processor 202 may be embodied as an executor of instructions, such as may be stored in memory 204, the instructions may specifically configure processor 202 to perform one or more algorithms, methods or operations described herein. For example, processor 202 may be configured to execute operating system applications, firmware applications, media playback applications, media editing applications, among other things.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing component or distributed across a plurality of computing components. In various embodiments, memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 204 may be configured to store information, data, applications, instructions, or the like for enabling circuitry 200 to carry out various functions in accordance with example embodiments discussed herein. For example, in at least some embodiments, memory 204 may be configured to buffer input data for processing by processor 202. Additionally or alternatively, in at least some embodiments, memory 204 may be configured to store program instructions for execution by processor 202 and/or data for processing by processor 202. Memory 204 may store information in the form of static and/or dynamic information. This stored information may be stored and/or used by circuitry 200 during the course of performing its functionalities.

Communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 and/or the like. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware and/or firmware/software for enabling communications. Communications module 206 may be configured to receive and/or transmit any data that may be stored by memory 204 using any protocol that may be used for communications. Communications module 206 may additionally and/or alternatively be in communication with the memory 204, input/output module 208 and/or any other component of circuitry 200, such as via a bus. Communications module 206 may be configured to use one or more communications protocols such as, for example, Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol Input/output module 208 may be in communication with processor 202 to receive an indication of an input and/or to provide an audible, visual, mechanical, or other output. In that sense, input/output module 208 may include means for performing analog-to-digital and/or digital-to-analog data conversions. Input/output module 208 may include support, for example, for a display, touch screen, keyboard, button, click wheel, mouse, joystick, an image capturing device, microphone, speaker, biometric scanner, and/or other input/output mechanisms. In embodiments where circuitry 200 may be implemented as a server or database, aspects of input/output module 208 may be reduced as compared to embodiments where circuitry 200 may be implemented as an end-user machine or other type of device designed for complex user interactions. In some embodiments (like other components discussed herein), input/output module 208 may even be eliminated from circuitry 200. Alternatively, such as in embodiments wherein circuitry 200 is embodied as a server or database, at least some aspects of input/output module 208 may be embodied on an apparatus used by a user that is in communication with circuitry 200. Input/output module 208 may be in communication with memory 204, communications module 206, and/or any other component(s), such as via a bus. Although more than one input/output module and/or other component can be included in circuitry 200, only one is shown in FIG. 2 to avoid overcomplicating the disclosure (e.g., like the other components discussed herein).

In some embodiments, promotion module 210 may also or instead be included and configured to perform the functionality discussed herein related providing promotions. In some embodiments, some or all of the functionality of promotion module 210 may be performed by processor 202. In this regard, the example processes and algorithms discussed herein can be performed by at least one processor 202 and/or promotion module 210. For example, non-transitory computer readable storage media can be configured to store firmware, one or more application programs, and/or other software, which include instructions and other computer-readable program code portions that can be executed to control processors of the components of system 200 to implement various operations, including the examples shown above. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Providing Multiple Promotions

FIG. 3 shows an example of a method 300 for providing multiple promotions, in accordance with some embodiments. Method 300 may be performed by system 102 (e.g., server 110), as shown in FIG. 1. Method 300 is described as being performed by server 110, however, other suitable structures (e.g., one or more servers, a networked device, circuitry, etc.) may also be used in various embodiments.

Method 300 may begin at 302 and proceed to 304, where server 110 may be configured to receive an item selected for primary purchase by a consumer. For example, the item selected for primary purchase by the consumer may be received from a consumer device 106 that is associated with the consumer and/or a consumer account of the consumer. A "primary purchase," as used herein, may refer to an initial purchase (and/or acceptance) of an item in an order and/or transaction that may include one or more additional items that may be added to the same order and/or transaction at a subsequent time.

In some embodiments, server 110 may be configured to provide items to consumers for purchase and/or acceptance. For example, server 110 may be configured to receive promotion data of the promotion from merchant device 108. Server 110 may be further configured to generate an impression indicating the promotion (and/or item) and provide the impression to consumer device 106.

FIG. 5 shows an example of an impression 500, in accordance with some embodiments. For example, impression 500 may be provided to consumer device 106 to offer a promotion to the consumer. Impression 500 may include an indication of promotion 502, which may include promotion name 504, promotion image 506, and/or promotion details 508. Impression 500 may further include purchase button 510 configured to allow the consumer to purchase and/or accept promotion 502. For example, server 110 may be configured to receive the item (e.g., promotion 502) selected for primary purchase by the consumer from consumer device 106 in response to the consumer selecting purchase button 510 with consumer device 106.

At 306, server 110 may be configured to associate the item with the consumer and/or consumer account of the consumer. For example, the item may be associated with the consumer via the consumer account. In some embodiments, server 110 may be configured to associate the item with the consumer and/or consumer account by associating the item with a virtual "shopping cart" of the consumer and/or consumer account. In that sense, the shopping cart may include one or more items selected by the consumer for subsequent purchase confirmation or "checkout."

At 308, server 110 may be configured to determine purchase transaction data. For example, the purchase transaction data may include data that may be used to complete the purchase of the item, such as credit card information, payment information, billing address, payment account information, among other things. In some embodiments, server 110 may be configured to access purchase transaction data (e.g., in database 112) that has been received and/or stored from previous interactions with the consumer via the consumer device. In some embodiments, server 110 may be configured to request and/or receive the purchase transaction data from the consumer device. Additionally and/or alternatively, server 110 may be configured to receive a particular type of data (which may also be referred to herein as "purchase transaction data") from the consumer device indicating a selection of purchase transaction data. For example, the purchase transaction data may be stored in database 112 and/or other suitable non-transitory storage medium and provided to consumer device 106 for selection of a particular credit card, bank account, payment account, etc.

FIG. 6 shows an example purchase confirmation display 600, in accordance with some embodiments. Purchase confirmation display 600 may be provided to consumer device 106 to confirm the purchase of the item and to allow the consumer to provide or otherwise select the purchase transaction data to be used in executing the purchase. In some embodiments, purchase confirmation display 600 may be provided to consumer device 106 in response to the consumer selecting buy button 510 in impression 500.

Purchase confirmation display 600 may include order summary 602, which may include an indication of one or more items that have been selected for purchase by the consumer. Purchase confirmation display 600 may further include purchase transaction data display 604, which may allow the consumer to enter purchase transaction data and/or other account information. For example, the consumer may enter a new payment method (e.g., credit card, bank account, checking account, payment account, etc.) by selecting new payment method button 606. Here, the consumer may be presented with a user interface configured to allow the consumer to enter the purchase transaction data. In an example where a credit card is the payment method, the purchase transaction data may include credit card number, expiration date, card verification number (CVV), consumer name, and/or billing information. In some embodiments, server 110 may be further configured to store the purchase transaction data received from the consumer device, such as within database 112.

In some embodiments, such as when the consumer is associated with a consumer account and has previously provided purchase transaction data, the previously provided payment transaction data may be provided as selectable options within purchase confirmation display 600. For example, server 110 may be configured to access database 112, where the purchase transaction data may be stored. Server 110 may be further configured to provide the purchase transaction data for selection by the consumer as shown by payment method buttons 608 and 610.

FIG. 7 shows an example purchase confirmation display 700, in accordance with some embodiments. The discussion above regarding purchase confirmation display 600 may be applicable to purchase confirmation display 700. Purchase confirmation display 700 may include order summary 702, purchase transaction data display 704, and consumer account creation/login display 706. In response to the consumer selecting new consumer button 708, the consumer may be prompted with account creation display 706, which may be configured to facilitate the creation of a new consumer account. Furthermore, in response to the consumer selecting existing consumer button 710, the consumer may be prompted to provide login data (e.g., identification and/or authentication data such as a username and/or password) for access to an existing consumer account.

As shown in purchase transaction data display 704, a new consumer may be prompted to provide purchase transaction data. Additionally and/or alternatively, purchase transaction data display 704 or other interface may be provided to consumer device 106 in response to the consumer selecting new payment method button 606 in purchase confirmation display 600. As such, server 110 may be configured to determine the purchase transaction data by receiving the purchase transaction data from consumer device 106.

At 310, server 110 may be configured to determine whether to finalize the primary purchase. For example, the determination to finalize the purchase may be based on receiving a purchase confirmation from the consumer device. In some embodiments, server 110 may be configured to provide a non-instant transaction to finalize the primary purchase. A "non-instant transaction," for example, may include a two-click transaction such that a minimum of two of consumer inputs may be used to complete the transaction. The first click, for example, may be the selecting of buy button 510 in impression 500 by the consumer. As discussed above, server 110 may be configured to associate the item with the consumer and/or consumer account (e.g., place in the consumer's shopping cart) in response to receiving the first click. Next, the consumer may then be presented with purchase confirmation display 600. In some embodiments, one of payment method buttons 608 or 610 may be preselected for the consumer, such as based on a payment method specified from a prior transaction. Here, if the consumer is satisfied with the preselected payment method, the second click for confirmation and/or finalization of the primary purchase may be the selection of confirm order button 612 in purchase confirmation display 600. "Click," as used herein, refers to a discrete consumer input and is not necessarily limited to inputs via a mouse. For example, in some embodiments, consumer device may include a touchscreen and/or other input device configured to receive the consumer inputs.

In response to determining that the primary purchase has not been finalized and/or after the item has been associated with the consumer and/or consumer account (e.g., at 306) for subsequent primary purchase confirmation, method 300 may proceed to 312, where server 110 may be configured to initiate a purchase confirm countdown timer. The purchase confirm countdown timer may indicate a period of time in which one or more items selected for primary purchase may remain associated with the consumer account (e.g., stay in the shopping cart) without a purchase confirmation from the consumer device being received by server 110.

In some embodiments, server 110 may be configured to provide the purchase confirm countdown timer (or a display or other indication of the purchase confirm countdown timer) to the consumer device. The purchase confirm countdown timer may be displayed in one or more different formats. For example, the purchase confirm countdown timer may be shown to the consumer for the full duration of the purchase confirm countdown timer or for a period of time that is shorter than the full duration (e.g., only shown countdown for the last 5 minutes). In another example, server 110 may be configured to alternatively or additionally send an alert indicating upcoming purchase confirm countdown timer expiration to the consumer device (e.g., "you have 5 minutes left"). In some embodiments, the purchase confirm countdown timer may be hidden or otherwise not displayed to the consumer (e.g., entirely or for some portion of its duration).

In some embodiments, a purchase confirm countdown timer may not be used and the item may remain in the consumer's shopping cart indefinitely, or at least until the consumer removes the item and/or the item is no longer available for purchase. In some embodiments, where a purchase confirm countdown timer is used, server 110 may be further configured to provide and/or present a purchase confirm countdown timer display indicating the purchase display countdown timer. For example, the purchase confirm countdown timer display may indicate that a consumer has five hours to confirm the purchase of the item before the item is removed from the consumer's shopping cart. Here, for example, the purchase confirm countdown timer may be started and/or initiated at five hours and configured to expire five hours later at time 0.

At 314, server 110 may be further configured to determine whether a primary purchase confirmation was received, such as from the consumer device. For example, server 110 may be configured to receive the primary purchase confirmation from consumer device 106, such as in response to the consumer selecting confirm order button 612 in purchase confirmation display 600.

In some embodiments, one or more of the additional items may additionally and/or alternatively be provided to the consumer device prior to checkout. For example, in response to the consumer selecting purchase button 510 in impression 500, server 110 may be configured to provide the one or more additional items to the consumer prior to purchase confirmation. Here, the one or more additional items may be selected by the consumer (e.g., by relevance and/or otherwise) and associated with the consumer for subsequent purchase confirmation. FIG. 10 shows an example checkout plus display 1000, in accordance with some embodiments. Checkout plus display 1000 may include may include offered items pane 1002 including icons each respectively representing each of the additional items (e.g., promotions) offered for purchase to the consumer, such as the icon associated with item 1004. Checkout plus display 1000 may further include add-to-cart button 1006, such as for one or more (or all) of the additional items within add-to-order display 1000. Here, the consumer may be allowed to add an additional item for subsequent purchase confirmation (e.g., to the shopping cart) via selecting an add-to-cart button 1006. In some embodiments, checkout plus display 1000 may further include an indication of the selected item, such as shown at purchase summary pane 1008. In some embodiments, purchase summary pane 1008 may be updated for each additional item 1004 selected by the consumer within offered items pane 1002. When the consumer is satisfied with the items shown in purchase summary pane 1008, the consumer may proceed to purchase confirmation via checkout button 1010. For example, server 110 may be configured to provide purchase confirmation display 600 and/or 700 to the consumer device including an order summary that includes each item shown in purchase summary pane 1008. Furthermore, the discussion herein regarding the item selected for primary purchase by the consumer (e.g., at 304) may be applicable to the items selected via checkout plus display 1000.

In response to determining that the primary purchase confirmation has failed to be received, method 300 may proceed to 316, where server 110 may be configured to determine whether the purchase countdown timer has expired. For example, where the purchase countdown timer was started at five hours, the purchase countdown timer may be determined to have expired five hours after initiation.

In response to determining that the purchase countdown timer has expired (e.g., without receiving the primary purchase confirmation) at 316, method 300 may proceed to 318, where server 110 may be configured to disassociate the item with the consumer and/or consumer account. For example, the item may be removed from the consumer's shopping cart without requiring further action by the consumer and/or receiving an instruction from the consumer device. Method 300 may then proceed to 320 and end.

Returning to 316, in response to determining that the purchase countdown timer has failed to expire, method 300 may return to 314, where server 110 may be configured to determine whether the primary purchase confirmation has been received. In some embodiments, server 110 may be configured to maintain the association between the item and the consumer and/or consumer account (e.g., keep the item in the consumer's shopping cart) prior to the expiration of the primary purchase countdown timer.

In response to determining that the primary purchase confirmation has been received at 314 and/or otherwise determining to finalize the primary purchase at 308, method 300 may proceed to 322, where server 110 may be configured to initiate an add-to-order session timer. The add-to-order session timer may indicate a period of time in which one or more additional items may be associated (e.g., to the same order and/or transaction as the item of the primary purchase) with the consumer. For example, the add-to-order session timer may be initiated at one hour such that the add-to-order session timer will expire one hour from the initiation of the add-to-order session timer at time 0.

In some embodiments, server 110 may be further configured complete a primary purchase transaction for the selected item based on the purchase transaction data. For example, server 110 may be configured to charge the consumer using the purchase transaction data. In some embodiments, server 110 may be configured to communicate with a third party payment server to complete the financial transaction. Here, server 110 may be further configured to receive transaction confirmation data indicating that the purchase transaction data was valid and/or successfully used to complete the primary purchase.

At 324, server 110 may be configured to generate an add-to-order display of add-to-order content including additional items offered for purchase to the consumer. FIG. 8 shows an example add-to-order display 800, in accordance with some embodiments. Add-to-order display 800 may include offered items pane 802 including icons each respectively representing each of the additional items (e.g., promotions) offered for purchase to the consumer, such as the icon associated with item 804. In that sense, generating the add-to-order display may include generating an offered items pane including icons each respectively representing each of the additional items offered to the consumer for purchase. Add-to-order display 800 may further include add-to-order button 812, such as for one or more (or all) of the additional items within add-to-order display 800. Here, the consumer may be allowed to add an additional item to the order via selecting an add-to-order button 812.

In some embodiments, server 110 may be further configured to provide an indication of the add-to-order session timer to the consumer device. For example, the add-to-order display may be configured to indicate the add-to-order session timer, such as add-to-order session timer 806 of add-to-order display 800. As shown, add-to-order session timer 806 indicates that the add-to-order session timer has 59:47 minutes remaining until expiration.

In some embodiments, server 110 may be configured to provide digital content describing the additional items offered for purchase to the consumer. The digital content may take the form of text, video, audio, among other things. For example, the one or more of the icons representing an additional item for purchase of the add-to-order display may be and/or include a thumbnail graphic representing a link to an impression of the additional item and/or other digital content describing the additional item. For example, icon 804 may include graphical link button 808. In that sense, the add-to-order display may include links to digital content describing the additional items.

FIG. 9 shows an example impression 900, in accordance with some embodiments. Impression 900 may be provided to the consumer device, such as in response to the consumer selecting graphical link button 808 and/or other link to impression 900. In some embodiments, impression 900 may be an example of the digital content describing the additional item. In that sense, the discussion above regarding impression 500 may be applicable to impression 900. For example, impression 900 may include item (e.g., promotion) 902. Impression 900 may further include add-to-order session timer 904. In some embodiments, the consumer may be allowed to navigate to the various displays, interfaces, and/or content provided by server 110 with the add-to-order session timer persisting across the various displays, interfaces, and/or content. For example, the add-to-order session timer may persist and countdown until expiration at time 0.

In some embodiments, one or more icons each representing an additional item for purchase of the add-to-order display may be and/or include a thumbnail graphic representing a link to a video describing the additional item. For example, impression 900 may include video display 906 configured to provide the video describing the good, service, and/or experience associated with promotion 902.

In some embodiments, server 110 may be configured to select the additional items for presentation to the consumer device based on relevance to the consumer. For example, server 110 may be configured to determine and/or receive data representing a set of items available for purchase, such as promotion data from database 112 in embodiments where the items are promotions. Server 110 may be further configured to assign a respective relevance metric (e.g., a relevance score) to one or more (e.g., each) of the items based on at least one of attributes of the item and attributes of the consumer. For example, the attributes of the item may include a merchant that is associated with the item, a category in which the item belongs (e.g., food and drink, events and activities, shopping, beauty and spa, among other things), a redemption time for promotions, a price of an item, among other things. In general, attributes of the item may include any characteristic and/or quality of the item that may be relevant to consumers in selecting the item for purchase. The attributes of the consumer may include characteristics of the consumer that may be relevant to the matching of items to consumers. For example, server 110 may be configured to track and/or otherwise determine the consumer's previous behavior including preferences, interests, purchases, profile, and/or item search queries (among other things) to determine the attributes of the consumer. In some embodiments, server 110 may further configured to select the additional server 110 may be further configured to additional items offered for purchase based on the relevance metric of each of the items. For example, one or more additional items determined to be most relevant, interesting, and/or otherwise likely to be purchased may be provided to the consumer via the add-to-order display. In some embodiments, the attributes of the item may additionally and/or alternatively include data indicating that an item is new, fresh, featured, popular, unpopular, or otherwise prioritized over other items. In some embodiments, server 110 may be further configured to order the set of items within the add-to-order display based on their respective relevance metrics.

In some embodiments, server 110 may be configured to select the additional items of the add-to-order display based on the item selected for primary purchase and/or the attributes of the item selected for primary purchase. Here, the one or more additional items may include items that are complementary, analogous, and/or otherwise related to the item selected for primary purchase. For example, where the item selected for primary purchase was flowers (and/or a promotion for flowers), server 110 may be configured to offer chocolates (and/or a promotion for chocolates) to the consumer based on the relevance and/or relationship between flowers and chocolates (e.g., for consumers with upcoming dates). Here, the relevance and/or relationship between items may be determined based on item sales data of consumers, comparisons of the attributes of available items, and/or item/promotion data indicating relevance associations between items.

In some embodiments, server 110 may be further configured to provide content describing an offer of at least one incentive to the consumer device. For example, an incentive may include one or more of a discount, credit, and free shipping. With reference to FIG. 8, for example, add-to-order display 800 may include incentive display 812. Here, incentive display 812 indicates that the consumer may get free shipping for items added to the order within the period of time defined by the add-to-order session timer. Alternatively and/or additionally, the incentive may take the form of a discount. For example, where the item is a promotion, the discount may be an additional discount that is applied on top of a discount that is defined by the promotion (e.g., pay $20 for a $40 value at a restaurant). In some embodiments, server 110 may be configured to dynamically determine the discount based on the additional items purchased by the consumer. For example, each additional item purchased may result in an increased discount for the additional item and/or for each selected item of the order. In general, server 110 may be configured to provide a message indicating the applicable incentive to persuade the consumer device such that the consumer may be persuaded to make additional purchases. In some embodiments, the incentive may take other forms, such as a credit that may be applied to a subsequent purchase, a free item and/or promotion, a reward, consumer loyalty points, and/or among other things.

At 326, server 110 may be associate the selected item with the consumer as a purchased item. The discussion at 306 may be applicable at 326, and where an item has already been associated with the consumer (e.g., at 306), server 110 may be configured to log the item as a purchased item. For example, server 110 may be configured to generate transaction data indicating that the consumer has agreed to purchase the item. In some embodiments, the item may be removed from the consumer's shopping cart or otherwise disassociated with the consumer as a pending item for subsequent purchase confirmation.

At 328, server 110 may be configured to determine whether the add-to-order session timer has expired. For example, if the add-to-order session timer was started and/or initiated at 1 hour, the add-to-order session timer may be determined to be expired 1 hour after the start at time 0.

In response to determining that the add-to-order session timer has failed to expire, method 300 may proceed to 330, where server 110 may be configured to determine whether a selection of an additional item offered for purchase was received. In some embodiments, selection of an additional item offered for purchase may be received from the consumer device. For example, the additional item offered for purchase may be offered via the add-to-order display of add-to-order content generated and/or provided to the consumer device. With reference to add-to-order display 800, for example, server 110 may be configured to receive the selection of additional item 804 in response to the consumer selecting associated add-to-order button 812.

In some embodiments, server 110 may be configured to provide an instant transaction to finalize the purchase of each additional item. An "instant transaction," as used herein, may include a "one-click transaction" such that a minimum number one consumer input may be used to complete the transaction for each additional item. For example, in response to the consumer finalizing the primary purchase (e.g., at 310, which may or may not be a two-click transaction), server 110 may be configured to provide a user interface for instant transactions, such as add-to-order display 800. For example, the consumer may be allowed to add item 804 in add-to-order display 800 with a single consumer input, such as via the selection of add-to-order button 812. Furthermore, the consumer may be allowed to add one or more of the other items in add-to-order display 800, respectively, with a single consumer input such as by selecting the appropriate add-to-order button associated with each offered additional item.

In response to determining that a selection of an additional item offered for purchase was received, method 300 may return to 328, where server 110 may be configured to associated the selected additional item with the consumer as a purchased item. For example, server 110 may be configured to generate transaction data indicating that the consumer has agreed to purchase the additional item. In response to determining that a selection of an additional item offered for purchase has failed to be received, method 300 may return to 328, where server 110 may be configured to determine whether the add-to-order session timer has expired. In some embodiment, prior to expiration of the add-to-order session, server 110 may be configured to allow the consumer to add additional items to the same ordering session as the primary purchase and/or receive the associated incentive(s) for doing so. In that sense, the consumer may be motivated to purchase additional items in a session where the consumer would have otherwise only purchased the item selected for primary purchase.

In some embodiments, further additional items and/or additional incentives may be unlocked by the consumer via the purchase an additional item. In response to receiving the selection of a first additional item offered for purchase (or a predetermined number of additional items) prior to expiration of the add-to-order session timer, for example, server 110 may be configured to provide a second additional item for purchase to the consumer by unlocking a selectable icon of the add-to-order display associated with the second additional item. For example, add-to-order button 814 of offered items pane 802 may be associated with a locked state in which add-to-order button 814 associated with the second additional item 816 may be hidden, obscured and/or otherwise unselectable for purchase. Here, server 110 may be configured to unhide, unobscure and/or otherwise make selectable add-to-order button 814 associated with the second additional item in response to determining that a first additional item (e.g., item 804) was selected for purchase. Here, the consumer may be incentivized to purchase even more additional items by providing enhanced and/or additional incentives based on purchases of additional items.

In response to determining that the add-to-order session timer has expired, server 110 may be configured to complete a purchase transaction for each item associated with the consumer. For example, server 110 may be configured to associate each additional item selected by the consumer prior to expiration of the add-to-order session timer. Where server 110 has not completed the primary purchase, the purchase transaction may further include the primary purchase for the item received at 304.

In some embodiments, server 110 may be configured to complete the purchase transaction for one or more additional items by providing the one or more of the discount, credit, and free shipping to the consumer, consumer device and/or consumer account.

In some embodiments, where one or more of the purchased items include a promotion, server 110 may be further configured to provide instrument that may be used (e.g., with the merchant) toward at least a portion of the purchase of particular goods, services and/or experiences defined by the promotion to the consumer device. An "instrument," as used herein, may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience.

At 334, server 110 may be configured to generate a purchase summary display and/or provide the purchase summary display to the consumer device. The purchase summary display may indicate the item of the primary transaction and/or the one or more additional items of the (e.g., add-to-order) purchase transaction. In some embodiments, the purchase summary display may include a cancelation option that is configured to allow the consumer to cancel the primary purchase transaction and/or one or more additional items of the add-to-order purchase transaction. For example, where the add-to-order items were completed with a one-click transaction, the consumer may be allowed to cancel purchases generated by inadvertent clicks. In another example, the consumer device may be provided with a confirmation display prior to the completion of the purchase transaction to ensure that the consumer is satisfied with the purchase of each selected item, such as upon expiration of the add-to-order timer. Method 300 may then proceed to 320 and end.

FIG. 4 shows an example of a method 400 for providing multiple promotions, in accordance with some embodiments. Method 400 may be performed by system 102 (e.g., server 110), as shown in FIG. 1. Method 400 is described as being performed by server 110, however, other suitable structures (e.g., one or more servers, a networked device, circuitry, etc.) may also be used in various embodiments.

Method 400 may begin at 402 and proceed to 404, where server 110 may be configured to receive an item selected by a consumer for purchase. The discussion at 304 of method 300 may be applicable at 404. For example, the item may be selected for purchase as part of a non-instant (e.g., two-click transaction including a minimum of two consumer inputs performed by the consumer on via the consumer device. Here, the selection of the item from a user interface (e.g., impression 500) may be indicated by the first consumer input. In some embodiments, server 110 may be further configured to associate the item with the consumer and/or consumer account, such as by associating the item with a virtual "shopping cart" of the consumer and/or consumer account.

At 406, server 110 may be configured to determine purchase transaction data. For example, the discussion at 306 of method 300 may be applicable at 406.

At 408, server 110 may be configured to complete a transaction for purchase of the selected item based on the purchase transaction data. In some embodiments, the discussion at 308-318 of method 300 may be applicable at 408. For example, server 110 may be configured to initiate a purchase countdown timer and complete the transaction for purchase of the selected item upon receiving a purchase confirmation from the consumer device. In another example, the purchase countdown timer may not be used and server 110 may be configured to complete the transaction upon receiving the purchase confirmation.

In some embodiments, the purchase confirmation may be indicated by the second consumer input of the two-click transaction for the selected item. For example, server 110 may be configured to receive the purchase confirmation from consumer device 106, such as in response to the consumer selecting confirm order button 612 in purchase confirmation display 600.

At 410, server 110 may be configured to generate redirect content including additional items offered to the consumer for purchase. In some embodiments, server 110 may be configured to select the additional items for presentation to the consumer device based on relevance to the consumer. In that sense, the discussion at 324 of method 300 regarding the various criteria that may be used to select the additional items may be applicable at 408. For example, server 110 may be configured to assign a respective relevance metric (e.g., a relevance score) to one or more (e.g., each) of available items based on at least one of attributes of the available items, attributes of the consumer, and/or attributes of the item selected for purchase.

At 412, server 110 may be configured to generate a purchase redirect display including the redirect content. The purchase redirect display may provide the consumer with a user interface, which may or may not include an indication of an add-to-order session timer. For example, some embodiments of method 400 may not include the leveraging of the add-to-order session timer and/or incentives associated with purchasing an additional item within the add-to-order session timer. In some embodiments, the purchase redirect display may be similar to or the same as add-to-order display 800 shown in FIG. 8 and/or impression 900 shown in FIG. 9. In that sense, the purchase redirect display may include the redirect content indicating each of the additional items (e.g., promotions) offered for purchase to the consumer, digital content describing the additional items, indications of one or more incentives associated with the purchase of one or more of the additional items, and/or interfaces for selecting one or more of the additional items for purchase, among other things.

At 414, server 110 may be configured to determine whether a selection of an additional item for purchase was received from the consumer device. The discussion at 330 of method 300 may be applicable at 414.

In response to determining that a selection for an additional item was received from the consumer device, method 400 may proceed to 416, where server 110 may be configured to determine whether to facilitate an instant transaction for the selected additional item. As discussed above, the instant transaction may be completed with a minimum of a single consumer input for each additional item. In general, server 110 may be configured to leverage the transaction data determined at 406 for subsequent additional items, without an additional confirmation and/or selection of purchase transaction data.

In some embodiments, server 110 may be configured to determine whether to facilitate the instant transaction based on the time at which the selection of the additional item was received (e.g., at 414) with respect to the time at which the first item selected by the consumer was received (e.g., at 404). For example, items that are selected for purchase within a predetermined time (e.g., within an add-to-order session timer and/or a redirect purchase timer), may be automatically completed using the same purchase transaction data. Additionally and/or alternatively, server 110 may be configured to determine whether to facilitate the instant transaction based on whether the selection of the additional item was received within the same communication session as the first item selected by the consumer.

In response to determining to facilitate the instant transaction for the selected additional item, method 400 may proceed to 418, where server 110 may be configured to complete the instant transaction for purchase of the selected additional item based on the purchase transaction data. FIG. 11 shows an example additional item purchase summary display 1100, in accordance with some embodiments. As discussed above, the consumer may be allowed to add item 804 in add-to-order display 800 and/or item 902 in impression 900 (and/or a redirect content display) with a single consumer input, such as via the selection of add-to-order button 812 and/or add-to-order button 906. Where an instant transaction is used, server 110 may be configured to provide purchase summary display 1100 to the consumer device in response to the consumer selecting add-to-order buttons 812 and/or 906 (e.g., the one-click).

In some embodiments, purchase summary display 1100 may be presented for a predetermined period of time to give the consumer a chance to cancel the transaction (or at least the purchase of the item being added) by selecting cancel purchase button 1110. In the absence of the consumer selecting cancel purchase button 1110 within the predetermined period of time (e.g., 5, 10 or 30 seconds), the transaction may be automatically completed. In this regard, server 110 may be configured to add the additional item to the transaction and process the order with the additional item by default unless addition consumer inputs indicating a different consumer intent is received from the consumer device.

Purchase summary display 1100 may include an indication of the additional item 1102, transaction data 1104, and instant transaction status indicator 1106. Here, unless the consumer takes additional action indicating a contrary intent, the purchase of the additional item may be automatically completed using transaction data 1104, which may be the same as the transaction data used for the first item at 408. In some embodiments, purchase summary display 1100 may further include change transaction data button 1108, which may allow the consumer to select a different payment transaction data (e.g., a different payment method and/or to add a new payment method) for the additional item. In some embodiments, purchase summary display 1100 may further include cancel transaction button 1110. In response to the consumer selecting cancel transaction button 1110, server 110 may be configured to cancel the instant transaction. In that sense, method 400 may be configured to provide the instant transaction, which may be modified and/or canceled by the consumer via additional consumer inputs. Method 400 may then proceed to 420 and end.

Returning to 414, in response to determining that a selection of an additional item has not been received by the consumer device at 414, method 400 may proceed to 420 and end.

Returning to 416, in response to determining to not facilitate the instant transaction for the selected additional item, method 400 may proceed to 422, where server 110 may be configured to complete a non-instant transaction for purchase of the selected additional item based on subsequently confirmed purchase transaction data. For example, server 110 may be configured to provide purchase confirmation display 600 to the consumer device including transaction data display 604, which may allow the consumer to enter and/or confirm purchase transaction data and/or other account information. In that sense, server 110 may be configured to handle the transaction for the selected additional item with as a non-instant transaction, such as in a manner similar to that of the first item received at 404 after determining to not facilitate the instant transaction for the selected additional item. Additionally and/or alternatively, techniques similar to method 300 and/or 400 may be performed where the additional item transaction is treated like the primary purchase. Method 400 may then proceed to 420 and end.

CONCLUSION

Many modifications and other embodiments will come to mind to one skilled in the art to which these embodiments pertain having the benefit of the teachings presented in the foregoing descriptions and the associated drawings. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising at least one processor and at least one non-transitory memory including program code, the at least one non-transitory memory and the program code configured to, with the at least one processor, cause the apparatus to:
   determine one or more additional items based on relevance data related to a primary purchase item that is associated with a user profile;
   generate a user interface comprising one or more item selection interface elements corresponding to the one or more additional items and without a purchase completion user interface element;
   determine at least one selected item from the one or more additional items based on at least one user selection input of the one or more item selection interface elements;
   receive an expiration signal indicating expiration of an automatic completion time period associated with the user interface; and execute an automatic purchase completion transition routine associated with the at least one selected item in response to receiving the expiration signal.

2. The apparatus of claim 1, wherein the relevance data defines at least one of complementary item data, analogous item data, or relevant item data associated with the primary purchase item.

3. The apparatus of claim 1, wherein the at least one non-transitory memory and the program code are configured to, with the at least one processor, cause the apparatus to:
obtain timer data associated with the user interface, wherein the timer data defines the automatic completion time period associated with the user interface.

4. The apparatus of claim 3, wherein the timer data further defines a selection time period, wherein the user interface is configured to enable the at least one user selection input within the selection time period.

5. The apparatus of claim 3, wherein the at least one non-transitory memory and the program code are configured to, with the at least one processor, cause the apparatus to:
determine the timer data based at least in part on a communication session time period associated with the primary purchase item.

6. The apparatus of claim 1, wherein the at least one non-transitory memory and the program code are configured to, with the at least one processor, cause the apparatus to:
in response to receiving the at least one user selection input, modify the automatic completion time period.

7. The apparatus of claim 1, wherein the one or more additional items comprise one or more links, wherein each of the one or more links is associated with at least one digital content.

8. A computer program product comprising at least one non-transitory computer-readable storage medium having computer-readable program code portions stored therein, the computer-readable program code portions comprising an executable portion configured to:
determine one or more additional items based on relevance data related to a primary purchase item that is associated with a user profile;
generate a user interface comprising one or more item selection interface elements corresponding to the one or more additional items and without a purchase completion user interface element;
determine at least one selected item from the one or more additional items based on at least one user selection input of the one or more item selection interface elements;
receive an expiration signal indicating expiration of an automatic completion time period associated with the user interface; and
execute an automatic purchase completion transition routine associated with the at least one selected item in response to receiving the expiration signal.

9. The computer program product of claim 8, wherein the relevance data defines at least one of complementary item data, analogous item data, or relevant item data associated with the primary purchase item.

10. The computer program product of claim 8, wherein the computer-readable program code portions comprise the executable portion configured to:
obtain timer data associated with the user interface, wherein the timer data defines the automatic completion time period associated with the user interface.

11. The computer program product of claim 10, wherein the timer data further defines a selection time period, wherein the user interface is configured to enable the at least one user selection input within the selection time period.

12. The computer program product of claim 10, wherein the computer-readable program code portions comprise the executable portion configured to:
determine the timer data based at least in part on a communication session time period associated with the primary purchase item.

13. The computer program product of claim 8, wherein the computer-readable program code portions comprise the executable portion configured to:
in response to receiving the at least one user selection input, modify the automatic completion time period.

14. The computer program product of claim 8, wherein the one or more additional items comprise one or more links, wherein each of the one or more links is associated with at least one digital content.

15. A computer-implemented method comprising:
determining one or more additional items based on relevance data related to a primary purchase item that is associated with a user profile;
generating a user interface comprising one or more item selection interface elements corresponding to the one or more additional items and without a purchase completion user interface element;
determining at least one selected item from the one or more additional items based on at least one user selection input of the one or more item selection interface elements;
receiving an expiration signal indicating expiration of an automatic completion time period associated with the user interface; and
executing an automatic purchase completion transition routine associated with the at least one selected item in response to receiving the expiration signal.

16. The computer-implemented method of claim 15, wherein the relevance data defines at least one of complementary item data, analogous item data, or relevant item data associated with the primary purchase item.

17. The computer-implemented method of claim 15 further comprising:
obtaining timer data associated with the user interface, wherein the timer data defines the automatic completion time period associated with the user interface.

18. The computer-implemented method of claim 17, wherein the timer data further defines a selection time period, wherein the user interface is configured to enable the at least one user selection input within the selection time period.

19. The computer-implemented method of claim 17 further comprising:
determining the timer data based at least in part on a communication session time period associated with the primary purchase item.

20. The computer-implemented method of claim 15 further comprising:
in response to receiving the at least one user selection input, modifying the automatic completion time period.

* * * * *

UNITED STATES PATENT AND TRADEMARK OFFICE
CERTIFICATE OF CORRECTION

| | | |
|---|---|---|
| PATENT NO. | : 11,501,361 B2 | Page 1 of 1 |
| APPLICATION NO. | : 17/301085 | |
| DATED | : November 15, 2022 | |
| INVENTOR(S) | : Hughes et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 49 days.

Signed and Sealed this
Fourteenth Day of January, 2025

Derrick Brent
*Acting Director of the United States Patent and Trademark Office*